(12) United States Patent
Torres

(10) Patent No.: US 7,775,371 B2
(45) Date of Patent: Aug. 17, 2010

(54) DEVICE FOR THE SEPARATION OF WASTE MATERIALS IN ACCORDANCE WITH THEIR DENSITIES

(76) Inventor: Jesús Sánchez Torres, Avda. Madrid, 179, escalera izquierda 3-4, 08028 Barcelona (ES)

( * ) Notice: Subject to any disclaimer, the term of this patent is extended or adjusted under 35 U.S.C. 154(b) by 148 days.

(21) Appl. No.: 11/944,211

(22) Filed: Nov. 21, 2007

(65) Prior Publication Data

US 2008/0121574 A1     May 29, 2008

(30) Foreign Application Priority Data

Nov. 29, 2006   (ES) ................................ 200602591

(51) Int. Cl.
B03B 1/00      (2006.01)
B03B 5/60      (2006.01)
B07B 1/28      (2006.01)

(52) U.S. Cl. .................... 209/172; 209/172.5; 209/173; 209/268; 209/315

(58) Field of Classification Search ................. 209/172, 209/172.5, 173, 268, 309, 314, 112, 315, 209/316, 317
See application file for complete search history.

(56) References Cited

U.S. PATENT DOCUMENTS

| | | | | | |
|---|---|---|---|---|---|
| 3,669,073 | A | * | 6/1972 | Savit et al. ................... | 399/240 |
| 4,713,252 | A | * | 12/1987 | Ismail ......................... | 426/290 |
| 5,060,870 | A | * | 10/1991 | Trezek et al. ................. | 241/19 |
| 5,331,087 | A | * | 7/1994 | Menges ....................... | 528/499 |
| 5,337,901 | A | * | 8/1994 | Skaer .......................... | 209/315 |
| 5,337,965 | A | * | 8/1994 | Chiovitti ...................... | 241/19 |
| 6,024,226 | A | * | 2/2000 | Olivier ....................... | 209/172.5 |
| 6,540,089 | B2 | * | 4/2003 | Brock et al. ................. | 209/316 |
| 6,562,396 | B1 | * | 5/2003 | Minier et al. ............... | 426/618 |
| 6,840,184 | B2 | * | 1/2005 | Eberhardt et al. ........... | 110/341 |
| 6,891,119 | B2 | * | 5/2005 | Grubbs et al. .............. | 209/587 |
| 7,111,739 | B2 | * | 9/2006 | Tsutsumi ..................... | 209/315 |
| 2003/0173268 | A1 | * | 9/2003 | Watters et al. .............. | 209/315 |

FOREIGN PATENT DOCUMENTS

EP      000457411 A1  *  11/1991
FR      2871393          5/2007

* cited by examiner

*Primary Examiner*—John Q. Nguyen
*Assistant Examiner*—Michael E. Butler
(74) *Attorney, Agent, or Firm*—Leason Ellis LLP

(57) ABSTRACT

A device for the separation of waste materials in accordance with their densities is provided and includes a vat which is fillable with a fluid for the separation of detritus by means of floatation and decantation. Conveyer belts are provided for the removal of the supernatant and decanted materials. A vibrating sieve is provided for the pre-separation of debris prior to introduction into the vat. The vibrating sieve extracts large materials and small materials which tend to produce silt in the vat. Means are provided for the removal of the decanted sludge.

5 Claims, 3 Drawing Sheets

DEVICE FOR THE SEPARATION OF WASTE MATERIALS IN ACCORDANCE WITH THEIR DENSITIES

This application claims the benefit of Spanish Application No. 200602591, filed Nov. 29, 2006, the entire disclosure of which is incorporated by reference.

OBJECT OF THE INVENTION

This invention relates to a device for the separation of waste materials in accordance with their densities, particularly waste from demolition sites and similar.

BACKGROUND OF THE INVENTION

Currently some waste materials, and rubble in particular, have no subsequent usefulness as they are a heterogeneous mixture of rubble, plastics, porcelain, metals and other materials, of highly different mechanical and physicochemical properties, which would entail separation of the same almost by hand. For this reason they are sent directly to the landfill.

In order to overcome this drawback, the applicant is the titleholder of the Utility Model 200401407 relating to a device for the separation of heterogeneous mixtures of materials with regard to the density of a fluid where the (heavy) rubble is separated from other lighter materials (plastics, etc.) thus permitting the use of the former for aggregates and other uses.

This device comprises a vat filled with a fluid—water—for the separation of the remains by means of flotation and decantation, while corresponding motorised conveyor belts remove the supernatants on one side and the decantates on the other, in the case of the supernatants with the aid of an element for sweeping the surface of the fluid, where said remains accumulate, towards the corresponding belt.

This device separates with efficacy, however, the vat tends to silt up rapidly due to the accumulation of sludges and small decanted detritus, making necessary frequent stoppages of the machine and cleaning of the vat. On the other hand, some large-sized detritus, such as sanitary porcelain and similar, are drawn with difficulty by the decantate conveyor belt.

Also, large-sized plastics and other detritus of a very low density are not drawn efficiently by the supernatant conveyor belt.

Finally, neither does the device of the Utility Model 200401407 contemplate the washing of the detritus.

These drawbacks are overcome by means of the use of the device of this invention.

DESCRIPTION OF THE INVENTION

The device of this invention operates optimally to carry out the separation of detritus due to its different densities, by means of flotation and decantation, overcoming the drawbacks described.

In accordance with the invention, the device is comprised of a vat filled with a fluid, where the detritus is separated by means of flotation and decantation; corresponding motorised conveyor belts extracting this detritus to the exterior of the vat with the aid of an element which sweeps the surface in the case of the supernatants.

The invention proposes the arrangement of a sloping vibrating sieve, either single or double, set above the vat, in such a way that the detritus passes first through said sieve, eliminating the excessively large or small debris in its single version, and both in its double version.

The introduction of a conveyor belt for the extraction of the sludges decanted to the bottom of the vat has also been foreseen; likewise the optional arrangement of sprinklers over the conveyor belts intended for the extraction of the detritus, for the washing of the same. Likewise, and optionally, the invention proposes the installation of a plenum connected to a turbine at the sieving zone, for the elimination of elements such as plastics.

DESCRIPTION OF A PREFERRED EMBODIMENT OF THE INVENTION

Figure 1:
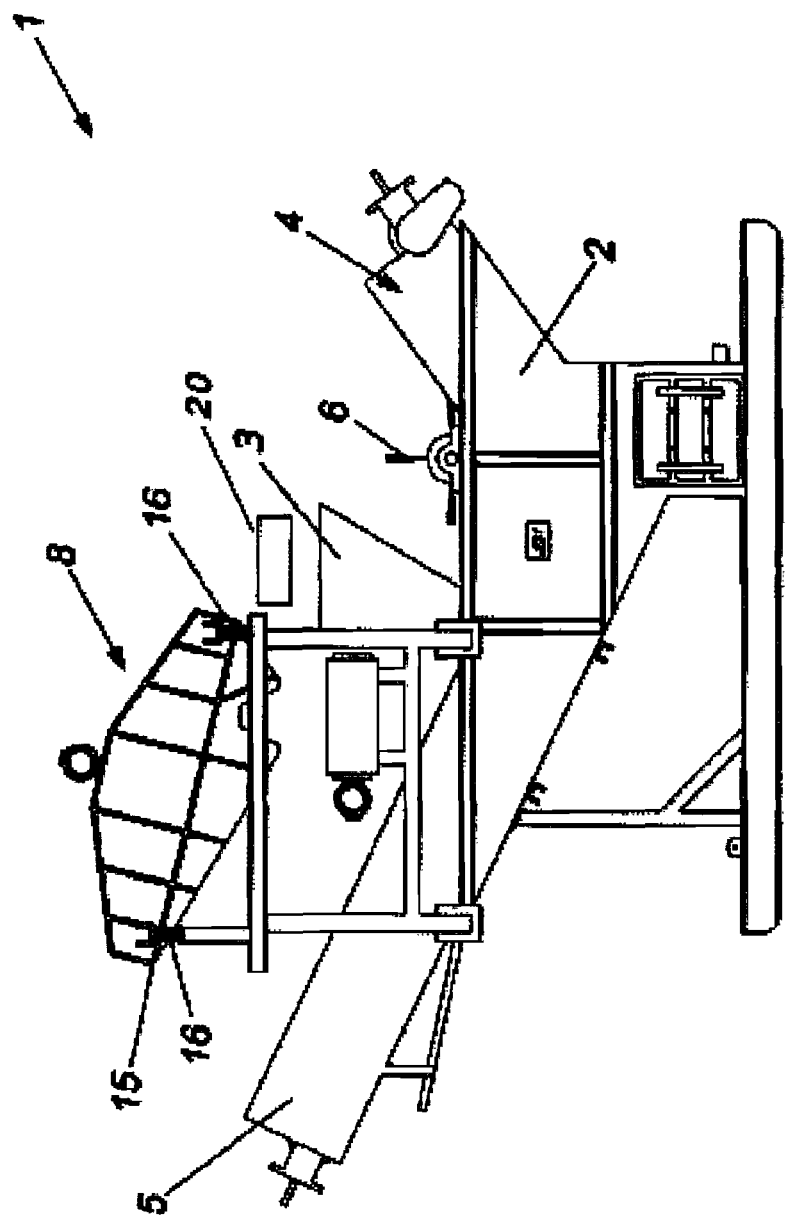
FIG. 1 portrays a view of the device of this invention.
Figure 2:
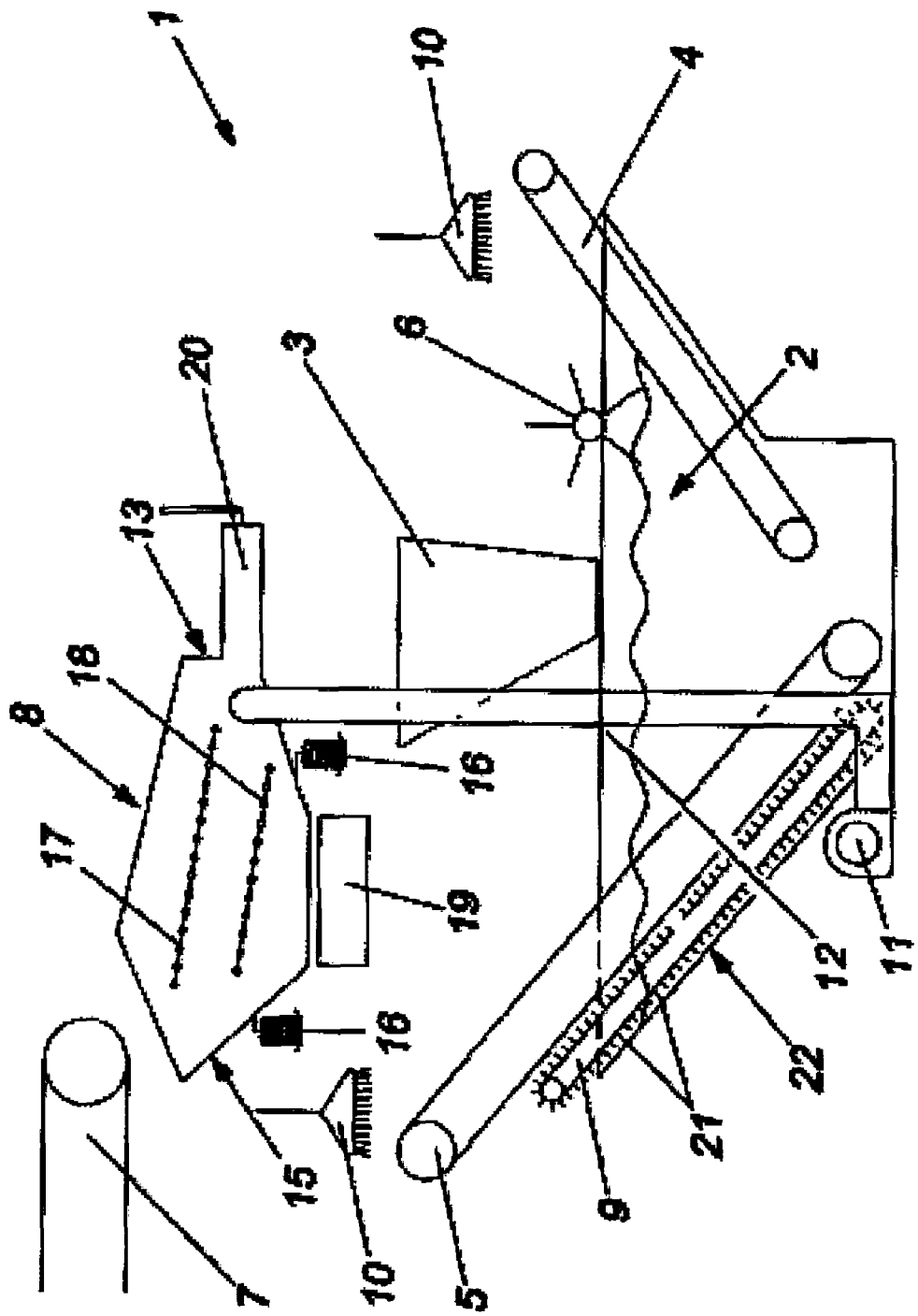
FIG. 2 portrays a schematic view of the complete version of the device of this invention.
Figure 3:
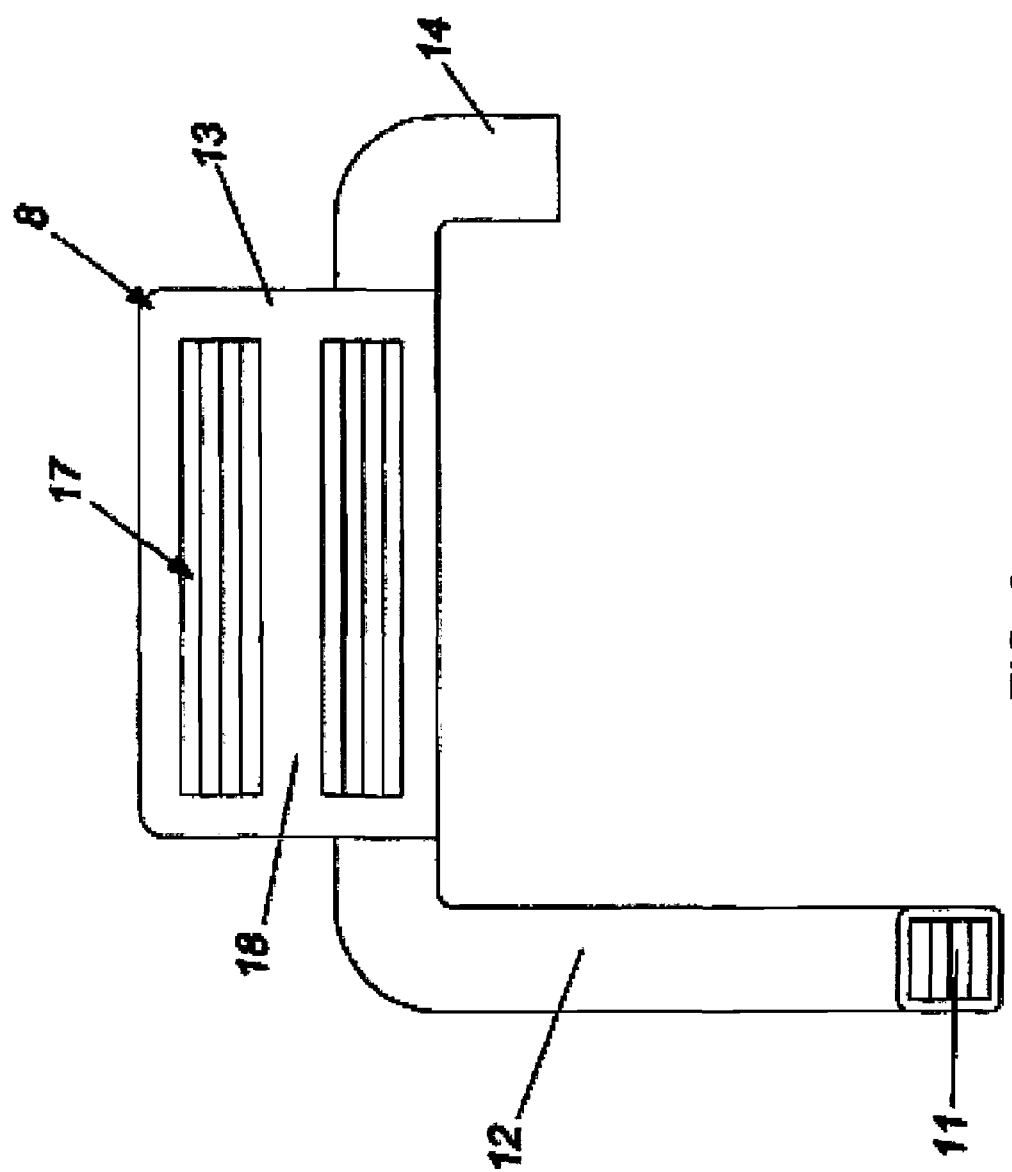
FIG. 3 portrays an outline of the optional air-blowing cleaning device.

The device 1 of this invention is comprised of a vat 2, this being fillable with a fluid of a suitable density, mainly water, through its corresponding ducts, not portrayed.

Above the vat there is arranged an upper chute 3 through which the mixture of detritus to be separated is poured. Within the vat there are also arranged motorised conveyor belts 4, 5 which extract towards divergent external zones the supernatant materials on the one side and the decanted materials on the other; a drum with rotating blades 6 having been foreseen to sweep the surface of the fluid and to help to amass the supernatants towards the corresponding conveyor belt.

In order to carry out the automatic feed of the detritus to be separated, an upper feed conveyor belt 7 has been foreseen, there having been inserted, in accordance with the invention, between this conveyor belt 7 and the chute 3 a double vibrating sieve 8 intended to carry out a preseparation of the debris which is excessively coarse and which is not easily extracted by the decantate conveyor belt, and the detritus of a very small size (principally sand) which tend to silt up the vat with the formation of sludges.

With the aim of preventing or delaying the silting up of the vat, another bottom-cleaning conveyor belt 9 has been included, while optionally the invention has foreseen the arrangement of a number of sprinklers 10 above the conveyor belts 4 and 5 in order to carry out the washing of the detritus.

To complement the separation by sieving, the invention has also foreseen the optional implementation of a device for cleaning by blowing, consisting of a turbine 11 connected via the corresponding duct 12 to a plenum 13 covering the sieving zone; as well as an outlet duct 14, in such a way that the air draught generated by the turbine draws the detritus of a plastic and similar type through the outlet duct 14.

In turn, the double sieve consists of a structure or chassis 15 mounted on elastic elements such as springs 16 and whose vibrating movement is caused by a suitable mechanism, not portrayed, and which typically shall comprise a motor with a cam or eccentric mass.

In the interior of this structure 15 a first upper sieve or mesh 17 with a greater opening, and another lower sieve or mesh 18 with a smaller opening are slopingly installed. The large-sized debris are held back at the upper mesh 17, and at the lower mesh 18 the detritus of a size suitable for separation in the vat; the detritus of a very small size (sand and similar) falling through this second sieve 18 onto a lower motorised conveyor belt 19 which removes the same, thus preventing its ingress into the vat.

Likewise, another lateral motorised conveyor belt 20 has been arranged for the removal of the debris held back by the upper sieve, which fall laterally onto the same, the sieve being sloping and due to the effect of the vibration.

For this same reason the detritus held back by the lower sieve falls into the chute 3 and therefore into the vat 2.

With regard to the bottom cleaning belt 9, this features lower transversal ridges 21 which collect and draw the sludges which are deposited on the bottom of the vat against the corresponding conveniently sloping lateral wall 22 of the vat to their external dumping.

In turn, the invention proposes the using of the water held in the vat 2 to supply the sprinklers 10, via a pump 23 and the corresponding piping 24 in which a filter 25 will be included; the water will then be collected once again and returned to the vat.

The nature of the invention having been sufficiently disclosed, likewise the practical embodiment of the same, it must be stated that the arrangements indicated above and portrayed in the drawings are susceptible to modifications of details in so far as they do not alter the fundamental concept of the same.

The invention claimed is:

1. A device for the automatic separation of detritus in accordance with their densities, comprising:
   an upper feed conveyor belt which feeds the detritus to be separated;
   a double vibrating sieve located after said upper feed conveyor belt intended to carry out a pre-separation of the detritus which are excessively coarse and the detritus of a very small size, principally sand, including:
      a structure on flexible supports, driven by a vibrating mechanism,
      an upper sloping sieve in the interior of the structure fitted with a mesh with large openings in order to hold back detritus too large to be suitable,
      a lateral conveyor belt adjacent to the upper sloping sieve arranged for the removal of detritus whose size is unsuitably large,
      a lower sloping sieve in the interior of the structure fitted with a mesh of small openings in order to hold back the detritus of a suitable size, allowing the detritus too small to be suitable to fall through the same,
      a channelling at a lateral zone of the lower sieve in order to bring about the falling and guiding of the detritus held back by the same, and
      an outlet duct through which the detritus of a plastic or similar type are drawn;
   a lower conveyor belt for the removal of said small detritus;
   a device for cleaning by blowing including:
      a plenum covering the upper and lower sloping sieves of the vibrating sieve,
      a duct connected to the plenum, and
      a turbine connected to said duct in such a way that the turbine draws the detritus of a plastic and similar type through the outlet duct of the vibrating sieve;
   a chute through which the detritus from the channelling of the vibrating sieve are poured; and
   a vat provided with sloping lateral walls wherein the detritus from the chute falls into, said vat is filled with a fluid for the separation of detritus by means of flotation and decantation, further including:
      a supernatant conveyor belt arranged on one of the sloping lateral wall within the vat for the removal to the exterior of the vat of the supernatant,
      a decanted materials conveyor belt arranged on the opposite sloping lateral wall within the vat for the removal to the exterior of the vat of the decanted materials, and
      a bottom cleaning belt located within the vat and provided with lower transversal ridges which collect and draw the sludges which are deposited on the bottom of the vat against one of the sloping lateral wall of the vat which cause the sludges to be drawn to the exterior of the vat.

2. A device according to claim 1, wherein the vat additionally comprises an element for the sweeping of the surface of the fluid in order to participate in the conveyance of the supernatants towards the supernatant conveyor belt.

3. A device according to claim 1, wherein it additionally comprises sprinklers arranged above the supernatant conveyor belt for the washing of the supernatants.

4. A device according to claim 1, wherein it additionally comprises sprinklers arranged above the decanted materials conveyor belt for the washing of the decantates.

5. A device according to claim 4, wherein the sprinklers are connected to the vat via a pump to supply the fluid contained within said vat, after filtering.

* * * * *